United States Patent [19]

Warren

[11] Patent Number: 5,431,236
[45] Date of Patent: Jul. 11, 1995

[54] METHOD FOR PROCESSING SOLID MATERIAL FOR DISPOSAL IN AN UNDERGROUND POROUS FORMATION

[76] Inventor: Jasper N. Warren, 11234 Spell Rd., Tomball, Tex. 77375

[21] Appl. No.: 292,881

[22] Filed: Aug. 19, 1994

[51] Int. Cl.⁶ ............................................ E21B 21/00
[52] U.S. Cl. ....................................................... 175/66
[58] Field of Search ................... 175/66, 88, 206, 207, 175/209, 217, 218

[56] References Cited

U.S. PATENT DOCUMENTS

| | | | |
|---|---|---|---|
| 4,726,301 | 2/1988 | Des Ormeaux et al. | 110/250 |
| 4,942,929 | 7/1990 | Malachosky et al. | 175/66 |
| 5,109,933 | 5/1992 | Jackson | 175/66 |
| 5,129,469 | 7/1992 | Jackson | 175/66 |
| 5,310,285 | 5/1994 | Northcott | 175/66 X |

OTHER PUBLICATIONS

"Offshore Disposal of Oil-Based Drilling Fluid Waste: An Environmentally Acceptable Solution", E. Malachosky, B. E. Shannon, and J. E. Jackson, ARCO Oil & Gas Co., Presentation at the First International Conference on Health, Safety and Environment held in The Hague, The Netherlands, 10–14 Nov. 1991. Copyright 1991, Society of Petroleum Engineers.

"Practical Cuttings Injection Design—Fine-particle, high-density slurries are key to effetive downhole disposal", P. R. Schuh, Conoco UK Ltd., and B. W. Secory and Eric Sorrie, Thule Rigtech. World Oil, Jul. 1994.

Primary Examiner—Michael Powell Buiz
Attorney, Agent, or Firm—John R. Kirk, Jr.; Jenkens & Gilchrist

[57] ABSTRACT

A method for processing solid materials for disposal in an underground porous formation includes separating an initial slurry mixture into predefined components, and then continually classifying, shearing, recirculating and diluting the separated components until all solid particles in the initial slurry mixture are reduced to a desirable size. The reduced solid particles are then injected, as a slurry, into a porous underground formation. The desirable size is less than a size that has been found to cause problems with present methods of injecting waste products in underground porous formations.

13 Claims, 1 Drawing Sheet

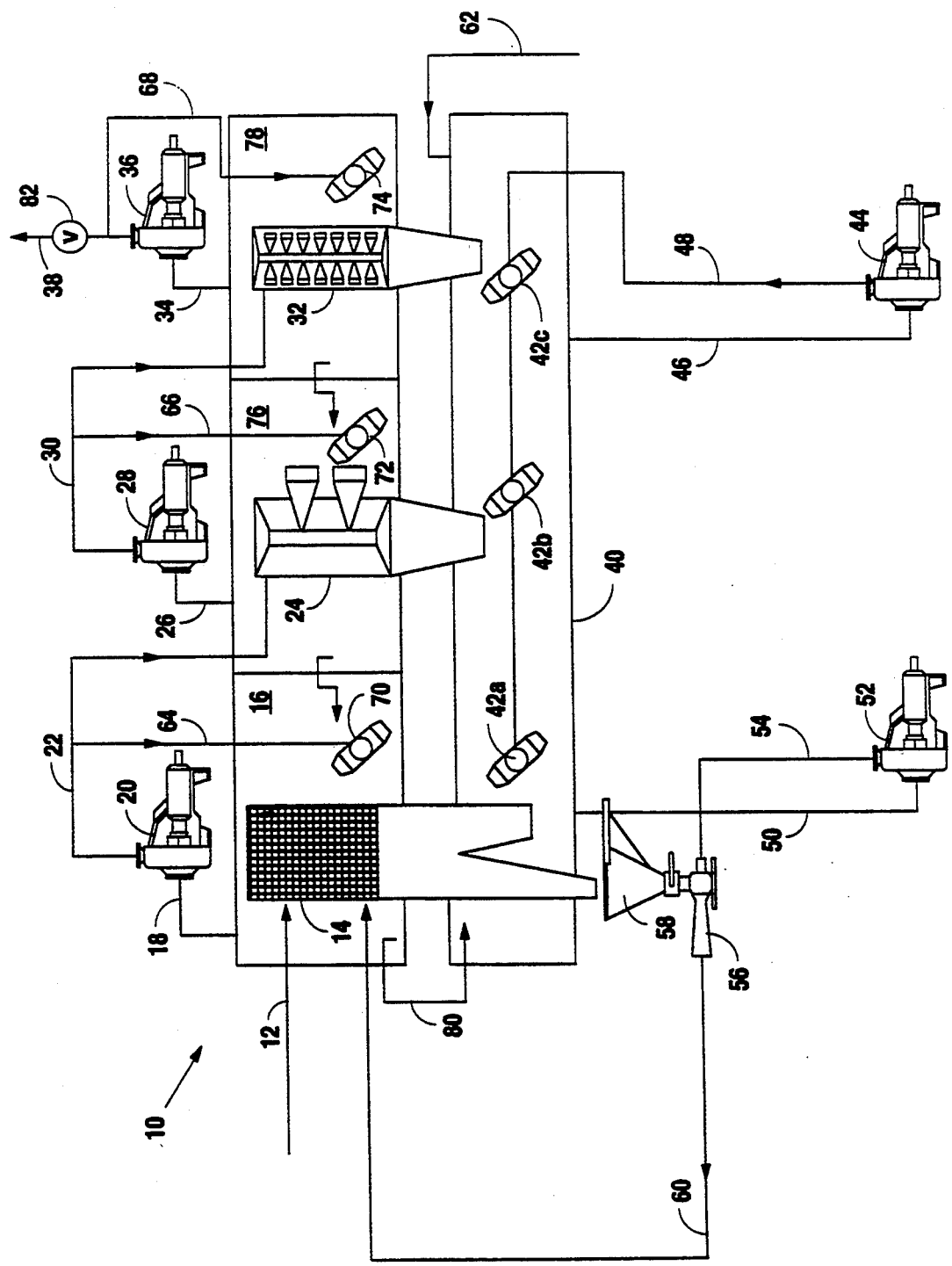

METHOD FOR PROCESSING SOLID MATERIAL FOR DISPOSAL IN AN UNDERGROUND POROUS FORMATION

TECHNICAL FIELD

This invention relates generally to a method for processing solid materials for disposal in an underground porous formation, and more particularly to a method by which the solid particles are controllably reduced to a predetermined size in a continuous process prior to disposal in the underground porous formation.

BACKGROUND ART

Drill cuttings and solid waste from oil and gas exploration and production wells are often reinjected into previously drilled well bores. For example, Edward Malachosky et al U.S. Pat. No. 4,942,929, issued on Jul. 24, 1990, discloses a method for separating gravel from fluid and cuttings produced during drilling of a well bore. The remaining material, which may contain sand, mud and other materials, is circulated through a centrifugal pump and either reinjected into the same well bore or into a preexisting well bore. This method requires that the gravel components be disposed of, hopefully as a construction material. Also, the method does not provide control of the particle size of the solid component in the slurry mixture injected into the well bore.

In a similar manner, James Jackson U.S. Pat. Nos. 5,109,933 and 5,129,469 issued respectively on May 5 and Jul. 14, 1992, disclose a method in which the drill cuttings are conveyed to a shearing and grinding system. The shearing and grinding system comprises one or more receiving tanks and an associated centrifugal pump that recirculates a mixture of the cuttings and water between the pump and the tank. The centrifugal pump is capable of reducing the solid cuttings to particles having a size of from less than 20 $\mu$m and as large as, it has been found, 300 $\mu$m. This mixture is then injected, under high pressure, into a subsurface formation by an injection pump. Thus, the size of the solid particles injected into the underground formation may range from less than 20 $\mu$m to at least 300 $\mu$m.

The above methods of disposing drill cuttings require that the processed slurry be pumped into an annular zone between a wellbore casing and the earth formation, by a high pressure injection pump, at a pressure sufficient to fracture the targeted earth formation. It has been found that liquids containing solid particles plug and seal the pores in sand formations, making it virtually impossible to inject large amounts of the fluid without applying pressures which may fracture the formation. For example, in carrying out the downhole injection of drill cuttings in a recent North Sea development project, a slurry injection pressure of 2,500 psi (17,225 kPa) was required to assure initiation of fractures in the sand formation selected for slurry deposition. Fracturing may allow the wastes to escape into other stratum that could contain usable quality water and hydrocarbons. The application of pressure sufficient to fracture impermeable shales and clays encasing the porous formation is unacceptable for the disposal of large quantities of slurry wastes. Consequently, on-site, high pressure waste disposal through the annulus of casing which fracture the recipient formation is being permitted for the disposal of only relatively small quantities of non-hazardous oil field wastes.

The present invention is directed to overcoming the problems set forth above and to providing a method for advantageously depositing large quantities of oil and gas production operation and other waste materials in underground porous formations. It has been discovered that the ability of underground porous geologic formations to accept slurry mixtures containing solid particles is very dependent upon the size of the solid particles in the slurry. This is particularly true of formations consisting of sand.

Specifically, it has been found that in non-sand porous formations, for example vuglar limestone, if the size of the solid particles in the slurry is reduced to no more than 50 $\mu$m, and preferably less than 35 $\mu$m, that plugging of pore openings and formation of flow-inhibiting sedimentary deposits within the formation is minimized if not avoided. As a result of controlling the size of solid particles in the slurry mixture, almost no impediment to flow and distribution of the slurry throughout the formation are introduced, and consequently much lower injection pressures, are possible to distribute the mixture throughout the formation. This discovery now makes it possible to greatly increase the utilization of underground porous formations as a result of increased storage capacity and the significantly reduced danger of fracture damage to surrounding formations. Thus underground porous formations that are sealed by surrounding formations are now usable for the disposal of solid waste materials, including radioactive and hazardous materials.

It is therefore desirable to have a method for controllably reducing the particle size of solid materials in a slurry solution to less than a very small predetermined size prior to depositing the slurry, at a relatively low pressure, into an underground porous formation.

DISCLOSURE OF THE INVENTION

In accordance with one aspect of the present invention, a method for processing solid materials for disposal in an underground porous formation includes forming an initial slurry mixture containing solid particles that have an average size of less than a first predetermined size, and then separating the initial slurry mixture into at least two components. The first component comprises a slurry mixture containing solid particles having a size less than a second predetermined size which is further separated into a slurry stream consisting essentially of solid particles having a size less than a third predetermined size, and a high-solids fraction containing solid particles greater than the third predetermined size. The solid particles in the high-solids fraction are continuously recirculated and simultaneously reduced in size until they have a size less than the third predetermined size, after which they are added into the slurry stream.

In accordance with another aspect of the present invention, the second component separated from the initial slurry mixture is introduced into an attrition zone wherein a portion of the second component is continuously recirculated and reduced in size and another portion is transferred from the attrition zone to the initial slurry mixture.

BRIEF DESCRIPTION OF THE DRAWING

The single drawing is a schematic diagram of an apparatus embodiment for carrying out the method of the present invention for processing solid materials.

BEST MODE FOR CARRYING OUT THE INVENTION

In carrying out the present invention, it is desirable that solid materials designated for subsequent deposit in an underground porous formation be first reduced, by grinding, chopping, milling or other conventional process to a size that can be suspended in, or carried by, a water based fluid.

Solid materials that are disposable in underground porous formations by the method embodying the present invention include commercial, industrial and residential waste, oil and gas drilling and production waste products, radioactive and other hazardous materials. Suitable sites for deposit of such materials typically include sand, and formations not consisting of sand, that are naturally isolated from other formations by seals consisting of impermeable shales and which have the ability to accept fluids containing solid particles up to about 50 $\mu$m without plugging the pores. Such formations provide little or no resistance to fluid injection. While sand formations are more common, formations not consisting of sand are fairly numerous and are typically found in scattered locations throughout geographic locations where oil and gas exploration and production activity exists.

After the waste material is reduced by conventional and well known means to solid particles having an average size less than a first predetermined size, additional water is added if necessary, and mixed to form an initial slurry. In carrying out the method for processing solid particles embodying the present invention, the initial slurry is processed by an apparatus 10 in which all of the solid particles are reduced to a required predetermined size prior to disposal in an underground porous formation. Preferably the waste material is initially reduced to solid particles having a size less than $\frac{1}{4}$ inch (0.6 cm) as a first predetermined size and transferred, as a slurry mixture, by a conduit 12 to a tandem screen separator 14. While almost any conventional screen separator known to those skilled in the art may be used, in the preferred embodiment of the present invention, the tandem screen separator 14 is a conventional dual unit and has orbiting horizontal screens that separate the initial slurry mixture into three components.

The first of the three components comprises the underflow particles, i.e., the material that passes through both screens of the separator 14 and falls into an underflow tank 16 disposed below the separator 14. The underflow particles therefore have a size less than a second predetermined size which, in the preferred embodiment of the present invention, is from about 200 to about 400 $\mu$m, most preferably about 250 $\mu$m. The underflow particles, or first component, is than pumped through conduits 18,22 by a transfer pump 20 to a desander 24. In the preferred embodiment of the present invention, the desander 24 is a conventional vertical unit having two 12 inch diameter hydrocyclones that separate the first component into a slurry stream and a high-solids fraction. In carrying out the present invention, the slurry stream discharged from the desander 24 primarily consists of particles having a particle size less than 50 to about 100 $\mu$m, preferably about 75 $\mu$m, and the high-solids fraction primarily contains solid particles greater than about 75 $\mu$m.

The slurry stream produced by the desander 24 is then pumped through conduits 26,30 by a transfer pump 28 to a desilter 32. In the preferred embodiment of the present invention, the desilter is a commercially available unit having sixteen 4-inch (10.16 cm) hydrocyclones which separate the preliminary slurry stream delivered from the desander 24 into a slurry stream consisting essentially of water and solid particles having a size less than a third predetermined size, and solid particles having a size greater than the third predetermined size. In the preferred embodiment of the present invention, the third predetermined size is desirably less than 50 $\mu$m, and preferably about 35 $\mu$m. The slurry stream is pumped from the desilter 32 through a conduit 34 by a low pressure injection pump 36 which deposits the slurry stream, under relatively low pressure, through conduit 38 to an underground porous formation. In the preferred embodiment of the present invention, the discharge pressure of the slurry stream from the injection pump is less than 125 psi (861 kPa). The discharge pressure of the injection pump is always less than the fracture gradient of the formation in which the solids are to be injected.

This invention is not limited to the equipment described above. The description of the preferred desander and desilter is made with the understanding that this equipment is well known equipment for slurry control. Selection of specific equipment depends upon many factors which vary with each waste being processed and the characteristics of each formation.

Thus it can be seen that the discharged slurry stream essentially consists of only water and very small solid particles which, it has been found, will not accumulate in porous formations and consequently cause closure of the pores in the formation prior to being distributed substantially uniformly throughout the formation. Also, the very low pressure required for injection is clearly insufficient to cause undesirable fracturing of the sealing formations surrounding the porous formation.

The second component of the initial slurry mixture consists of solid particles that pass through the first screen of the separator 14 and thus have a size greater than that of the first component, i.e., greater than the second predetermined size, which in the preferred embodiment as above stated is from about 200 to about 400 $\mu$m, most preferably, about 250 $\mu$m. The second component of the initial slurry stream, along with the high-solids fraction produced by the desander 24 and the larger-sized particle stream from the desilter 32, is directed to a shear hank 40 which contains, in the preferred embodiment, three shear nozzles 42a,42b,42c. Shear nozzles are well known and available. Preferably, the shear nozzles 40 are conventional low pressure mud guns which, as a result of discharging solid particles at very high velocity, i.e., preferably over 5,000 ft/s (1524 m/s) induce shear stresses in the particles of a magnitude sufficient to cause fracturing of the particle. Shear nozzles should be made of wear-resistant materials to withstand the solids passing through them. Such selection is well known.

Material within the shear tank 40 is continuously recirculated through a recirculating shear pump 44 which withdraws liquid laden with solid particles from the shear tank 40 through a conduit 46 and pumps the particles back into the tank 40 through a conduit 48 in communication with the shear nozzles 42a,42b,42c. Thus, the shear tank 40, the nozzles 42a,42b,42c, and the shear pump 44 all cooperate to form an attrition zone wherein the solid particles are progressively diminished in size.

Importantly, to enhance the attrition of the solid particles in the slurry by shearing, the density of slurry mixture in the shear tank is maintained at a high solids content, preferably at a weight of from about 10.5 to about 12 lbs/gallon (1.26 to 1.44 kg/L). Water, when required to improve the pumping ability of the slurry in the shear tank 40 and consequently throughout the apparatus 10, is selectively added through a water line 62. The water line 62 may either be connected to a fresh or waste water source. Water addition most often is required as the particle size is reduced.

Concurrently with the progressive diminution of solid particles in the attrition zone, a portion of the solid particles are continuously withdrawn from the shear tank 40 through a conduit 50 by a second shear pump 52 which directs the withdrawn material through a venturi nozzle 56 disposed immediately downstream of the base opening in a shear hopper 58. The third component of the initial slurry mixture, comprising the solid particles that do not pass the first screen of the separator 14, is transferred from the separator 14 to the hopper box of the shear hopper 58. The particle size of the solid particles comprising the third component is therefore greater than a fourth predetermined size which is determined by the mesh or sieve size of the first screen. In the preferred embodiment of the present invention, the fourth predetermined size is from about 600 to about 1000 $\mu$m, most preferably about 850 $\mu$m.

The solid particles comprising the third component of the initial slurry mixture are drawn into the venturi section 56 by a high velocity slurry stream pumped from the shear tank 40, liquefied by mixing with the attrited particles from the shear tank 40, pumped through a conduit 60, and reintroduced into the apparatus 10. Operatively, the mixed material delivered through the conduit 60 is combined with the initial slurry stream, either as an actual part of the initial stream or as a separate stream introduced directly into the separator 14.

It is also desirable to continuously recirculate a small portion of the discharge from each of the transfer pumps 20,28 and the injection pump 36 through respective conduits 64,66,68 and a respectively associated shear nozzle 70,72,74. The shear nozzles 70,72,74 are respectively disposed in the underflow tank 16 of the separator 14 and in collection tanks or troughs 76,78 associated with the desander 24 and the desilter 32. The desander collection tank 76 is interconnected with the desilter collection tank 78 to accept overflow from the desilter collection tank 78. In similar manner, the underflow tank 16 is interconnected to the desander collection tank 76 to accept overflow from the desander collection tank 76. Furthermore, the underflow tank 16 is desirably interconnected with the shear tank 40 by a conduit 80 so that excess overflow accumulating in the underflow tank 16 is directed to the shear tank 40.

The continuous recirculation of a portion of the discharge from the transfer and injection pumps 20,28,36 serves two purposes. First, during periods of reduced or zero material through-flow, i.e., relatively idle periods in which little or no material is being added to or discharged from the apparatus 10, the reirculated flow provides cooling for the pumps. To prevent depletion of the recirculating slurry during such periods, a throttle valve 82, preferably a pinch valve having a urethane liner in the throat of the valve, is inserted in the injection conduit 38 the purpose of selectively reducing or stopping the discharge of processed slurry from the system. Thus, it can be seen that, by appropriate control of the pinch valve 82, the system is able m continue recycling, shying, pump cooling and other functional operations during periods of time when material is not added at a uniform, continuous rate. Secondly, continuous material discharge from the shear nozzles 70,72,74 in each of the tanks prevents settlement of solid particles in the tanks while simultaneously further reducing the size of the solid particles. Preferably, all of the pumps in the apparatus 10 are centrifugal pumps which wear resistance surfaces.

Thus, the method embodying the present invention is a continuous process of classifying, shearing and diluting until all solid particles are reduced to a desirable size that is less than the size, it has been found, causing the problems associated with the present methods for reducing, treating and injecting waste products into underground porous formations.

Industrial Applicability

The present invention provides a relatively safe, convenient, long term, and economical method for disposing of waste materials. The elements of apparatus 10 comprising the equipment for carrying out the disposal method embodying the present invention are commercially available. The apparatus 10 may conveniently be mounted on a trailer or skid for transport and operation, and is useful on land as well as offshore sites. The system is very flexible and can be adjusted to handle increased slurry volume or particle size reduction capability by the addition of additional shearing nozzles, pumps and hydrocyclones.

Importantly, the method embodying the present invention is useful for treating solid radioactive and many other waste materials. By reducing the waste materials to a very fine particle size and forming a slurry stream containing the small sized solid particles, the material can be deposited at low pressures thereby reducing the possibility of fracturing surrounding sealing formations and assuring more complete utilization of the underground formation.

Presently, radioactive and hazardous waste materials are typically collected, containerized in special drums, and temporarily stored at a licensed site. The present treatment method is expensive and exposes the environment to harmful contamination if the containerization is inadequate or fails during storage. Furthermore, current disposal practices intrude on the public domain making it difficult to secure sites where permanent storage may be carried out.

Thus, the present invention provides a waste treatment plan that will reduce the cost of treating radioactive, hazardous, or oil exploration and production waste materials, and will reduce the waste to a final form that can be totally and permanently deposited in secure underground locations, thereby eliminating the risk of future contamination to the environment.

Other aspects, features and advantages of the present invention can be obtained from a study of this disclosure together with the appended claims.

What is claimed is:

1. A method for processing solid materials for disposal in an underground porous formation, comprising:
   forming an initial slurry mixture containing solid particles having an average particle size less than a first predetermined size;
   separating said initial slurry mixture into at least first and second components, the first component comprising a slurry mixture containing solid particles having a size less than a second predetermined size and the second component containing solid particles having a size greater than said second predetermined size, said second predetermined size being less than said first predetermined size;

separating the first component into a slurry stream consisting essentially of water and solid particles having a size less than a third predetermined size and a high-solids fraction comprising solid particles having a size greater than said third predetermined size, said third predetermined size being less than said second predetermined size;

continuously recirculating and reducing the size of the solid particles in said high-solids fraction to a size less than said third predetermined size;

subsequently adding the solid particles in said high-solids fraction, after reduction to said third predetermined size, to said slurry stream; and injecting said slurry stream into said porous underground formation.

2. The method for processing solid materials for disposal in an underground porous formation, as set forth in claim 1, wherein after separating said initial slurry mixture into at least first and second components, said method includes;
introducing the second component into an attrition zone to effect particle size reduction;
continuously recirculating a portion of the second component within said attrition zone; and
simultaneously transferring another portion of the second component from said attrition zone to said initial slurry mixture.

3. The method for processing solid materials for disposal in an underground porous formation, as set forth in claim 2, wherein the step of continuously recirculating a portion of the second component within the attrition zone includes pumping said portion through at least one shear nozzle disposed in said attrition zone.

4. The method for processing solid materials for disposal in an underground porous formation, as set forth in claim 1, wherein said third predetermined particle size of said particles in the slurry stream is a size less than that at which the particles will accumulate and cause the closure of pores in said porous underground formation prior to said stream being distributed substantially uniformly throughout said formation.

5. The method for processing solid materials for disposal in an underground porous formation, as set forth in claim 1, wherein said third predetermined particle size of said particles in the slurry stream is less than about 50 $\mu$m.

6. The method for processing solid materials for disposal in an underground porous formation, as set forth in claim 1, wherein said first predetermined particle size of said particles in the initial slurry mixture is less than about 0.6 cm (0.25 in).

7. The method for processing solid materials for disposal in an underground porous formation, as set forth in claim 1, wherein said second predetermined size is from about 200 to about 400 $\mu$m.

8. The method for processing solid materials for disposal in an underground porous formation, as set forth in claim 1, wherein injecting the slurry stream into said porous underground formation includes pumping the slurry stream through a pump and discharging the stream into the underground porous formation at a pressure less than that sufficient to deleteriously fracture other formations surrounding the underground porous formation.

9. The method for processing solid materials for disposal in an underground porous formation, as set forth in claim 8, wherein said method includes continuously recirculating a portion of the slurry stream through said pump.

10. The method for processing solid materials for disposal in an underground porous formation, as set forth in claim 1, wherein separating the initial slurry includes:
separating the initial slurry into three components, said third component comprising solid particles having a size greater than a fourth predetermined size, said fourth predetermined size being greater than the second predetermined size;
delivering the third component to a shear hopper;
passing the third component through said shear hopper;
liquefying the third component; and
combining the liquefied third component with said initial slurry.

11. The method for processing solid materials for disposal in an underground porous formation, as set forth in claim 10, wherein said fourth predetermined size is from about 600 to about 1000 $\mu$m.

12. The method for processing solid materials for disposal in an underground porous formation, as set forth in claim 1, wherein continuously recirculating and reducing the size of said high-solids fraction includes:
introducing the high-solids fraction into an attrition zone to effect particle size reduction;
mixing said high-solids fraction with said second component of the initial slurry composition in said attrition zone;
continuously recirculating a portion of the mixture of the high-solids fraction and said second component within the attrition zone; and
simultaneously transferring another portion of the mixture of the high-solids fraction and said second component from said attrition zone to said initial slurry mixture.

13. The method for processing solid materials for disposal in an underground porous formation, as set forth in claim 1, wherein separating the first component into a slurry stream consisting essentially of water and solid particles having a size less than a third predetermined size includes sequentially passing the first component through a desander and a desilter.

* * * * *